United States Patent
Boyd et al.

(10) Patent No.: US 7,464,189 B2
(45) Date of Patent: Dec. 9, 2008

(54) SYSTEM AND METHOD FOR CREATION/DELETION OF LINEAR BLOCK ADDRESS TABLE ENTRIES FOR DIRECT I/O

(75) Inventors: William Todd Boyd, Poughkeepsie, NY (US); John Lewis Hufferd, San Jose, CA (US); Agustin Mena, III, Austin, TX (US); Renato John Recio, Austin, TX (US); Madeline Vega, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 11/135,539

(22) Filed: May 23, 2005

(65) Prior Publication Data

US 2006/0265521 A1 Nov. 23, 2006

(51) Int. Cl.
*G06F 3/00* (2006.01)
*G06F 13/28* (2006.01)
*G06F 12/00* (2006.01)
*G06F 17/30* (2006.01)

(52) U.S. Cl. .............................. 710/3; 710/22; 707/204
(58) Field of Classification Search ..................... 710/3, 710/22; 707/204
See application file for complete search history.

(56) References Cited

U.S. PATENT DOCUMENTS

| | | | |
|---|---|---|---|
| 4,796,178 A | 1/1989 | Jennings et al. | |
| 5,313,592 A | 5/1994 | Buondonno et al. | |
| 5,369,749 A | 11/1994 | Baker et al. | |
| 5,377,337 A | * | 12/1994 | Antognini et al. .......... 718/100 |
| 5,414,851 A | 5/1995 | Brice, Jr. et al. | |
| 5,535,416 A | 7/1996 | Feeney et al. | |
| 5,659,798 A | 8/1997 | Blumrich et al. | |
| 5,732,269 A | 3/1998 | Compton et al. | |
| 5,893,919 A | 4/1999 | Sarkozy et al. | |

(Continued)

FOREIGN PATENT DOCUMENTS

JP 10289158 A 10/1998

(Continued)

OTHER PUBLICATIONS

Boyd et al., System and Method for Processor Queue to Linear Block Address Translation Using Protection Table Control Based on a Protection Domain.

(Continued)

*Primary Examiner*—Tonia L. M. Dollinger
*Assistant Examiner*—Brooke J Dews
(74) *Attorney, Agent, or Firm*—Stephen J. Walder, Jr.; Casimer K. Salys

(57) ABSTRACT

A method that enables application instances to pass block mode storage requests directly to a physical I/O adapter without run-time involvement from the local operating system or hypervisor is provided. In one aspect of the method, a mechanism is provided for handling user space creation and deletion operations for creating and deleting allocations of linear block addresses of a physical storage device to application instances. For creation, it is determined if there are sufficient available resources for creation of the allocation. For deletion, it is determined if there are any I/O transactions active on the allocation before performing the deletion. Allocation may be performed only if there are sufficient available resources and deletion may be performed only if there are no active I/O transactions on the allocation being deleted.

7 Claims, 11 Drawing Sheets

U.S. PATENT DOCUMENTS

| | | | |
|---|---|---|---|
| 5,926,833 | A | 7/1999 | Rasoulian et al. |
| 5,968,143 | A | 10/1999 | Chisholm et al. |
| 5,983,301 | A | 11/1999 | Baker et al. |
| 5,991,753 | A | 11/1999 | Wilde |
| 6,003,123 | A | 12/1999 | Carter et al. |
| 6,009,476 | A | 12/1999 | Flory et al. |
| 6,047,307 | A | 4/2000 | Radko |
| 6,061,794 | A | 5/2000 | Angelo et al. |
| 6,092,168 | A | 7/2000 | Voigt |
| 6,115,772 | A | 9/2000 | Crater |
| 6,145,030 | A | 11/2000 | Martwick |
| 6,192,408 | B1 | 2/2001 | Vahalia et al. |
| 6,247,024 | B1 * | 6/2001 | Kincaid ................. 707/204 |
| 6,345,301 | B1 | 2/2002 | Burns et al. |
| 6,345,347 | B1 | 2/2002 | Biran |
| 6,360,282 | B1 | 3/2002 | Langerman et al. |
| 6,446,209 | B2 | 9/2002 | Kern et al. |
| 6,493,825 | B1 | 12/2002 | Blumenau et al. |
| 6,535,518 | B1 | 3/2003 | Hu et al. |
| 6,550,061 | B1 | 4/2003 | Bearden et al. |
| 6,553,412 | B1 | 4/2003 | Kloba et al. |
| 6,578,122 | B2 | 6/2003 | Beukema et al. |
| 6,594,787 | B1 | 7/2003 | Chesson |
| 6,654,818 | B1 | 11/2003 | Thurber |
| 6,665,747 | B1 * | 12/2003 | Nazari ................. 710/22 |
| 6,704,831 | B1 | 3/2004 | Avery |
| 6,718,372 | B1 | 4/2004 | Bober |
| 6,721,847 | B2 | 4/2004 | Hursey |
| 6,751,680 | B2 | 6/2004 | Langerman et al. |
| 6,753,873 | B2 | 6/2004 | Dixon et al. |
| 6,789,143 | B2 | 9/2004 | Craddock et al. |
| 6,816,891 | B1 | 11/2004 | Vahalia et al. |
| 6,834,332 | B2 | 12/2004 | Craddock et al. |
| 6,842,784 | B1 | 1/2005 | Black |
| 6,845,403 | B2 | 1/2005 | Chadalapaka |
| 6,996,638 | B2 | 2/2006 | Brice, Jr. et al. |
| 7,124,207 | B1 | 10/2006 | Lee et al. |
| 7,272,676 | B2 | 9/2007 | Saito et al. |
| 2002/0004890 | A1 | 1/2002 | Ofek et al. |
| 2002/0059309 | A1 | 5/2002 | Loy et al. |
| 2002/0078239 | A1 | 6/2002 | Howard et al. |
| 2002/0083224 | A1 | 6/2002 | Langerman et al. |
| 2002/0091841 | A1 | 7/2002 | Beukema |
| 2002/0099879 | A1 | 7/2002 | Bayer et al. |
| 2002/0124013 | A1 | 9/2002 | Loy et al. |
| 2002/0124148 | A1 | 9/2002 | Beukema et al. |
| 2002/0147916 | A1 | 10/2002 | Strongin et al. |
| 2002/0169938 | A1 | 11/2002 | Scott et al. |
| 2002/0194408 | A1 | 12/2002 | Capps, Jr. et al. |
| 2003/0009484 | A1 | 1/2003 | Hamanaka et al. |
| 2003/0023791 | A1 | 1/2003 | Suzuki et al. |
| 2003/0078944 | A1 | 4/2003 | Yamauchi et al. |
| 2003/0093625 | A1 | 5/2003 | Beukema et al. |
| 2003/0110205 | A1 | 6/2003 | Johnson |
| 2003/0110445 | A1 | 6/2003 | Khaleque |
| 2003/0115221 | A1 | 6/2003 | Goode et al. |
| 2003/0182422 | A1 | 9/2003 | Bradshaw et al. |
| 2003/0200298 | A1 | 10/2003 | Su et al. |
| 2003/0229690 | A1 | 12/2003 | Kitani et al. |
| 2003/0233564 | A1 | 12/2003 | LaRose et al. |
| 2004/0003137 | A1 | 1/2004 | Callender et al. |
| 2004/0010701 | A1 | 1/2004 | Umebayashi et al. |
| 2004/0049580 | A1 | 3/2004 | Boyd et al. |
| 2004/0049603 | A1 | 3/2004 | Boyd et al. |
| 2004/0054866 | A1 | 3/2004 | Blumenau et al. |
| 2004/0078521 | A1 | 4/2004 | Hawks et al. |
| 2004/0083308 | A1 | 4/2004 | Sebastian et al. |
| 2004/0165607 | A1 | 8/2004 | Carnevale et al. |
| 2004/0193825 | A1 | 9/2004 | Garcia et al. |
| 2004/0210598 | A1 | 10/2004 | Sturms |
| 2005/0021848 | A1 | 1/2005 | Jorgenson |
| 2005/0044375 | A1 | 2/2005 | Paatero et al. |
| 2005/0066076 | A1 | 3/2005 | Best et al. |
| 2005/0091029 | A1 | 4/2005 | Traut |
| 2005/0091383 | A1 | 4/2005 | Bender et al. |
| 2005/0138230 | A1 | 6/2005 | Raisch |
| 2005/0246453 | A1 | 11/2005 | Erlingsson et al. |
| 2006/0168365 | A1 | 7/2006 | Martinez et al. |
| 2006/0212608 | A1 | 9/2006 | Arndt et al. |
| 2006/0212620 | A1 | 9/2006 | Arndt et al. |
| 2006/0265522 | A1 | 11/2006 | Boyd et al. |
| 2006/0265525 | A1 | 11/2006 | Boyd et al. |
| 2006/0265561 | A1 | 11/2006 | Boyd et al. |
| 2006/0288125 | A1 | 12/2006 | Boyd et al. |
| 2007/0130356 | A1 | 6/2007 | Boucher et al. |

OTHER PUBLICATIONS

Boyd et al., System and Method for Processing Block Mode I/O Operations Using a Linear Block Address Translation Protection Table.

Boyd et al., System and Method for Out of User Space Block Mode I/O Directly Between an Application Instance and an I/O Adapter.

Boyd et al., System and Method for User Space Operations for Direct I/O Between an Application Instance and an I/O Adapter.

Boyd et al., System and Method for Query/Modification of Linear Block Address Table Entries for Direct I/O.

Arndt et al., Data Processing System, Method, and Computer Program Product for Creation and Initialization of a Virtual Adapter on a Physical Adapter that Supports Virtual Adapter Level Virtualization, U.S. Appl. No. 11/065,829, filed Feb. 25, 2005.

U.S. Appl. No. 11/135,257, filed May 23, 2005, Boyd et al.

U.S. Appl. No. 11/216,712, filed Aug. 31, 2005, Boyd et al.

U.S. Appl. No. 11/216,736, filed Aug. 31, 2005, Boyd et al.

U.S. Appl. No. 11/216,832, filed Aug. 31, 2005, Boyd et al.

U.S. Appl. No. 11/216,879, filed Aug. 31, 2005, Boyd et al.

"Prevent Unauthorized Access to Data in Database Servers by the Transaction Manager", IBM Technical Disclosure No. NA9402629, vol. 37, Issue No. 2A, Feb. 1, 2994, 4 pages.

"Asynchronous Queued I/O Processor Architecture", IBM Technical Disclosure No. NN9301265, vol. 36, Issue No. 1, Jan. 1, 1993, 12 pages.

Fiuczynski et al., "Spine: A Safe Programm", Proceedings of the 8th ACM Sigops European workshop on Support for composing distributed applications. Sep. 1998, 9 pages.

CICS System Definition Guide, Release 3, IBM, SC33-1682-02, Third Edition, Mar. 1999, pp. 104 and 199.

* cited by examiner

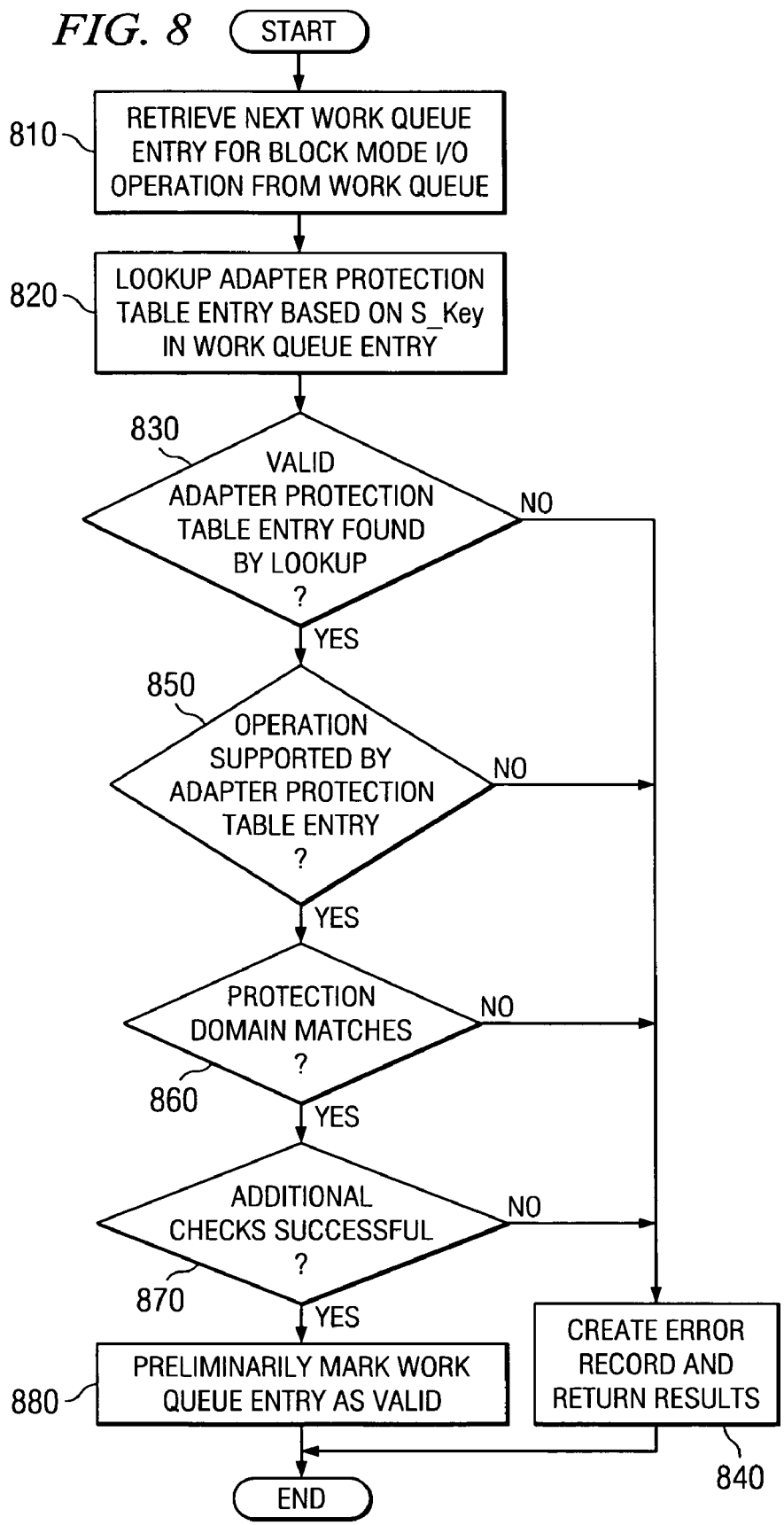

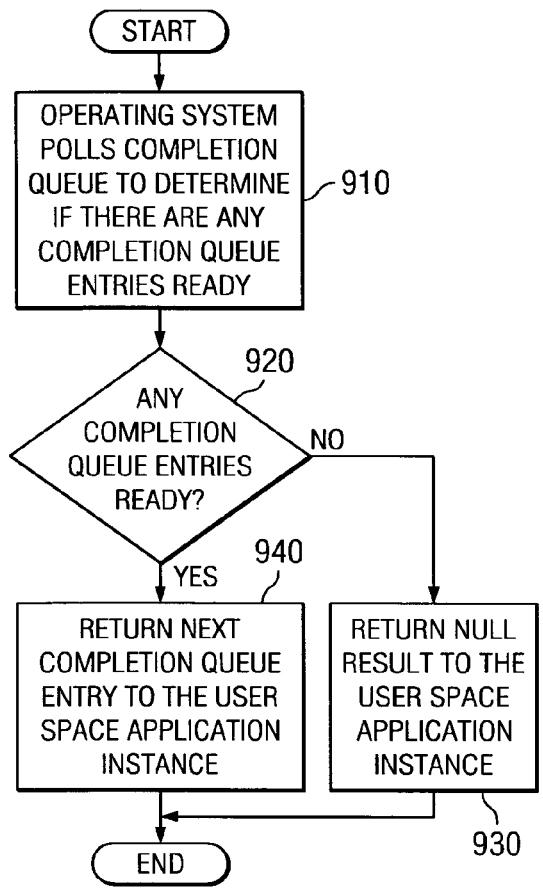
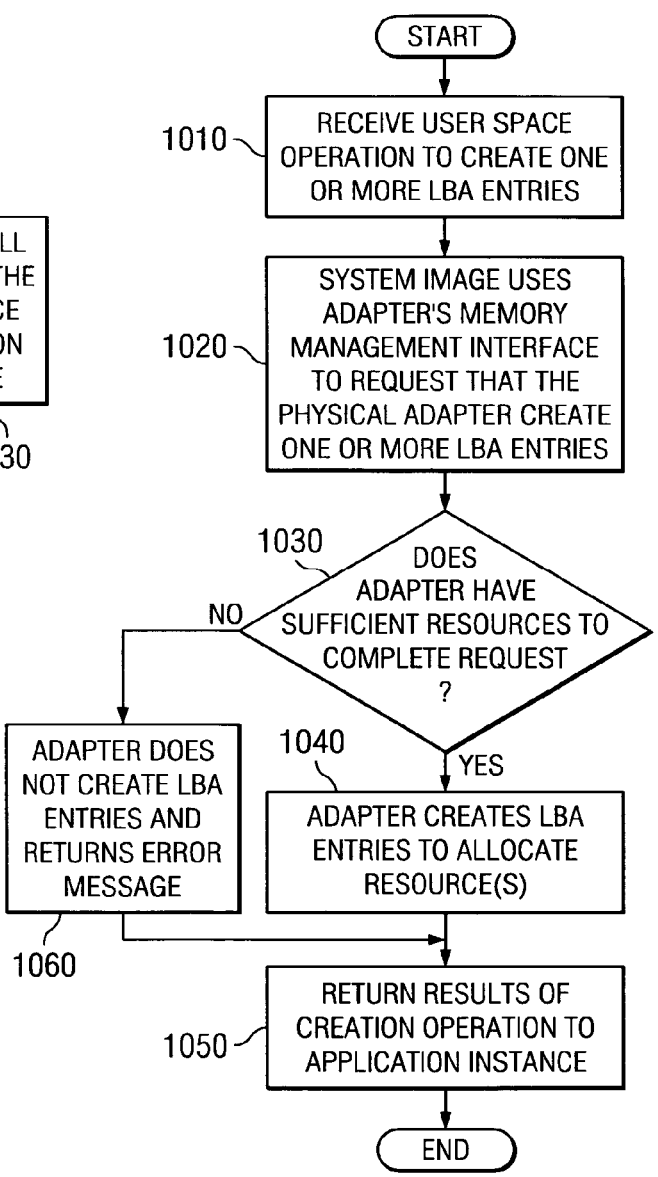

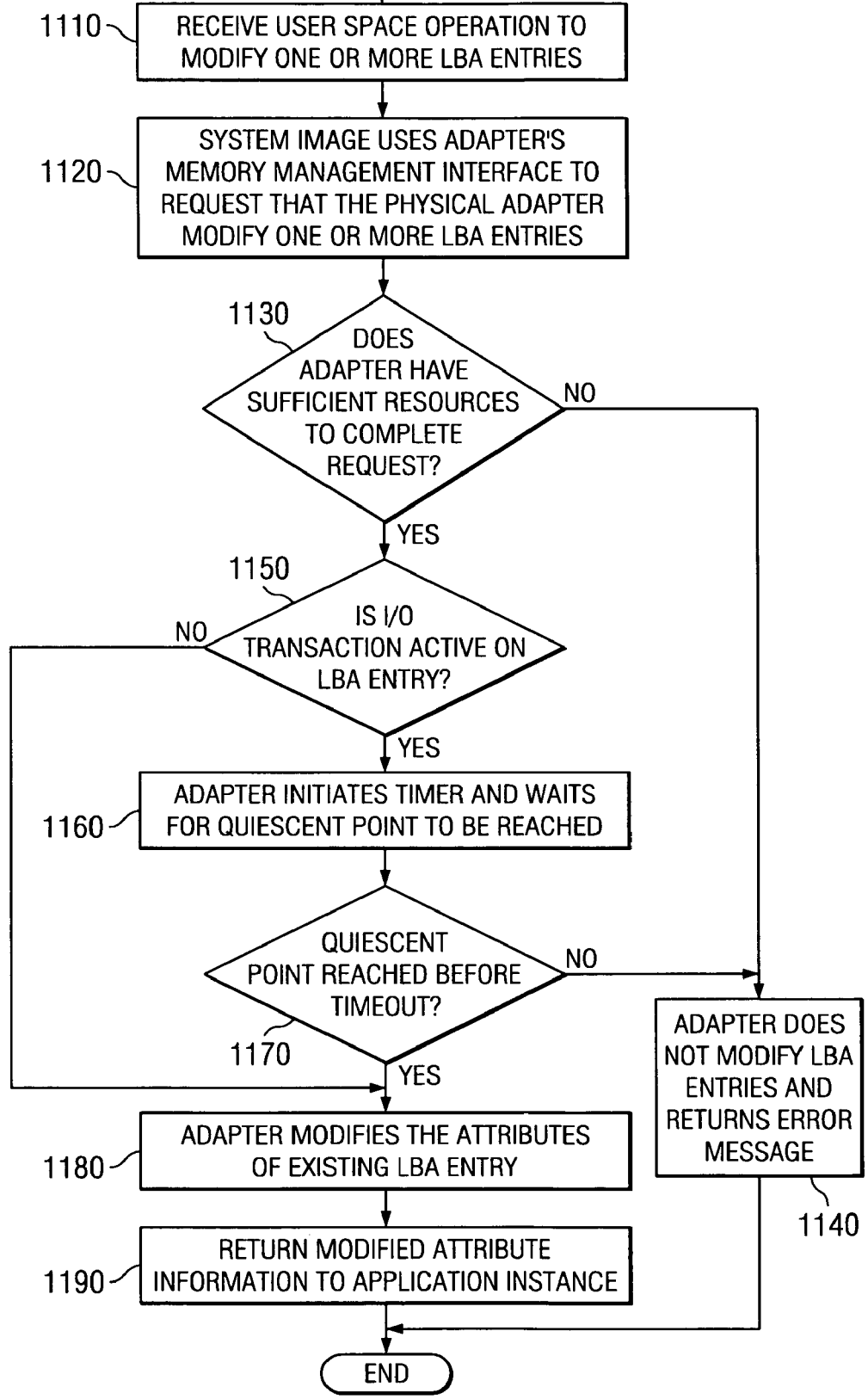

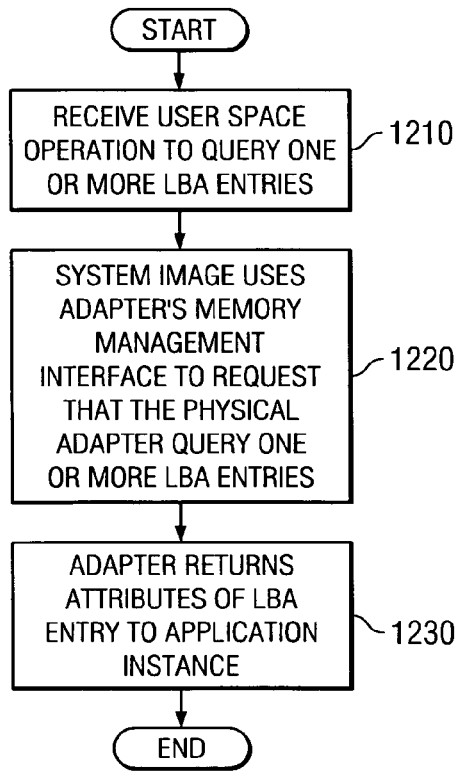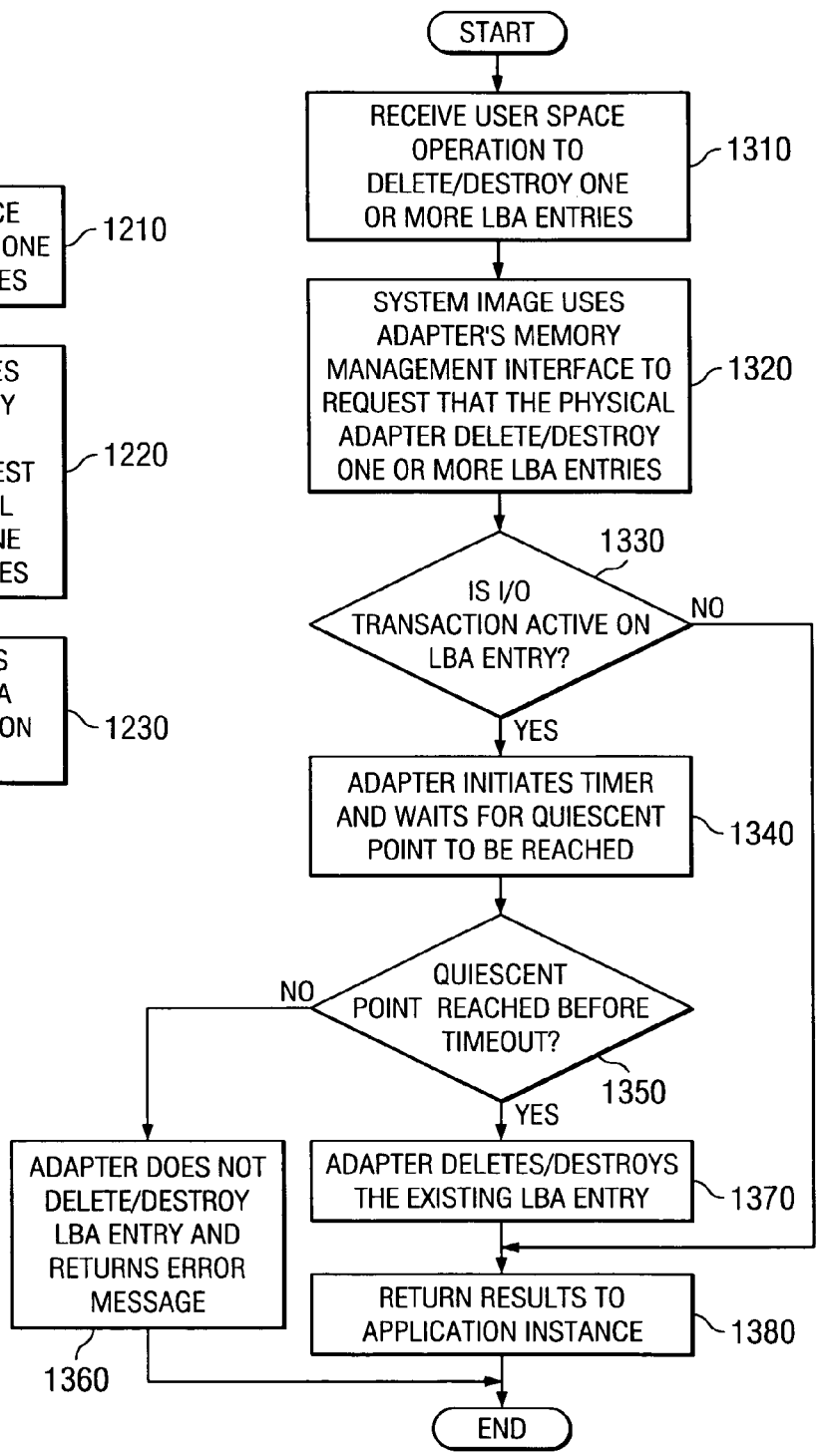

SYSTEM AND METHOD FOR CREATION/DELETION OF LINEAR BLOCK ADDRESS TABLE ENTRIES FOR DIRECT I/O

BACKGROUND OF THE INVENTION

1. Technical Field

The present invention relates generally to communication protocols between a host computer and an input/output (I/O) Adapter. More specifically, the present invention is directed to a system and method for enabling user space middleware or applications to pass block mode storage requests directly to a physical I/O adapter without run-time involvement from the local Operating System (OS), or, in a virtual system, the local hypervisor.

2. Description of Related Art

Operating systems, according to the present state of the art, do not permit user space middleware or applications, such as a database, to directly access persistent storage that is identified through the Operating System's Raw Mode Storage I/O interface or the Operating System's Logical Volume Storage I/O interface. As a result, the user space middleware must invoke an Operating System (OS) call and incur several task switches every time an I/O operation is performed. The first task switch is caused when the middleware or application transfers a storage request to the OS. A second task switch occurs when the OS passes control back to the user space middleware or application, after the OS completes processing the middleware or application storage request and passes the storage request to the storage adapter.

A third task switch occurs when the storage adapter completes the associated block mode I/O storage operations and interrupts the processing being performed by an application so that the OS may process the storage adapter's completion. The final task switch occurs when the OS finishes processing the storage adapter's completion and gives control back to the middleware or application that transferred the storage request to the OS. In addition to these task switches the storage adapter typically has a single request queue to process work from the operating system.

The four task switches described above may be considered wasted processor cycles, because all work on the thread being switched is stopped until the task switch is complete. On some servers, the number of storage operations performed by a user space middleware or application program may be quite large. Modern, high-end servers may have millions of these operations per second, resulting in several million task switches per second.

SUMMARY OF THE INVENTION

In one illustrative embodiment, a method is provided for implementation in an input/output (I/O) adapter. The method comprises receiving, from an application instance, a user space operation requesting creation of a resource allocation for direct linear block address (LBA) based input/output (I/O) between the application instance and a physical storage device. The method further comprises creating the resource allocation in a LBA table entry, of an LBA table, associated with the I/O adapter and the application instance and returning results of the creation of the resource allocation to the application instance. The method also comprises receiving, from the application instance, a second user space operation requesting de-allocation of second resources and deleting an LBA table entry corresponding to the second resources from the LBA table. Deleting the LBA table entry includes determining if an I/O transaction is active on the LBA table entry and deleting the LBA table entry only if there are no I/O transactions active on the LBA table entry.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 8 is a flowchart outlining an exemplary operation of one exemplary embodiment of the present invention when performing validation checks to determine if a work queue entry is valid and may be processed by the physical I/O adapter;

FIG. 9 is a flowchart outlining an exemplary operation of one exemplary embodiment of the present invention when the invoked user space operation is a completion queue retrieval process operation;

FIG. 10 is a flowchart outlining an exemplary operation of one exemplary embodiment of the present invention when creating a LBA entry in an LBA table in accordance with an exemplary embodiment of the present invention;

FIG. 11 is a flowchart outlining an exemplary operation of one exemplary embodiment of the present invention when processing a user space operation that is a resource modify operation;

FIG. 12 is a flowchart outlining an exemplary operation of one exemplary embodiment of the present invention when processing a query user space operation; and FIG. 13 is a flowchart outlining an exemplary operation of one exemplary embodiment of the present invention when processing a destroy or delete user space operation.

DETAILED DESCRIPTION OF THE PREFERRED EMBODIMENTS

Figure 1:
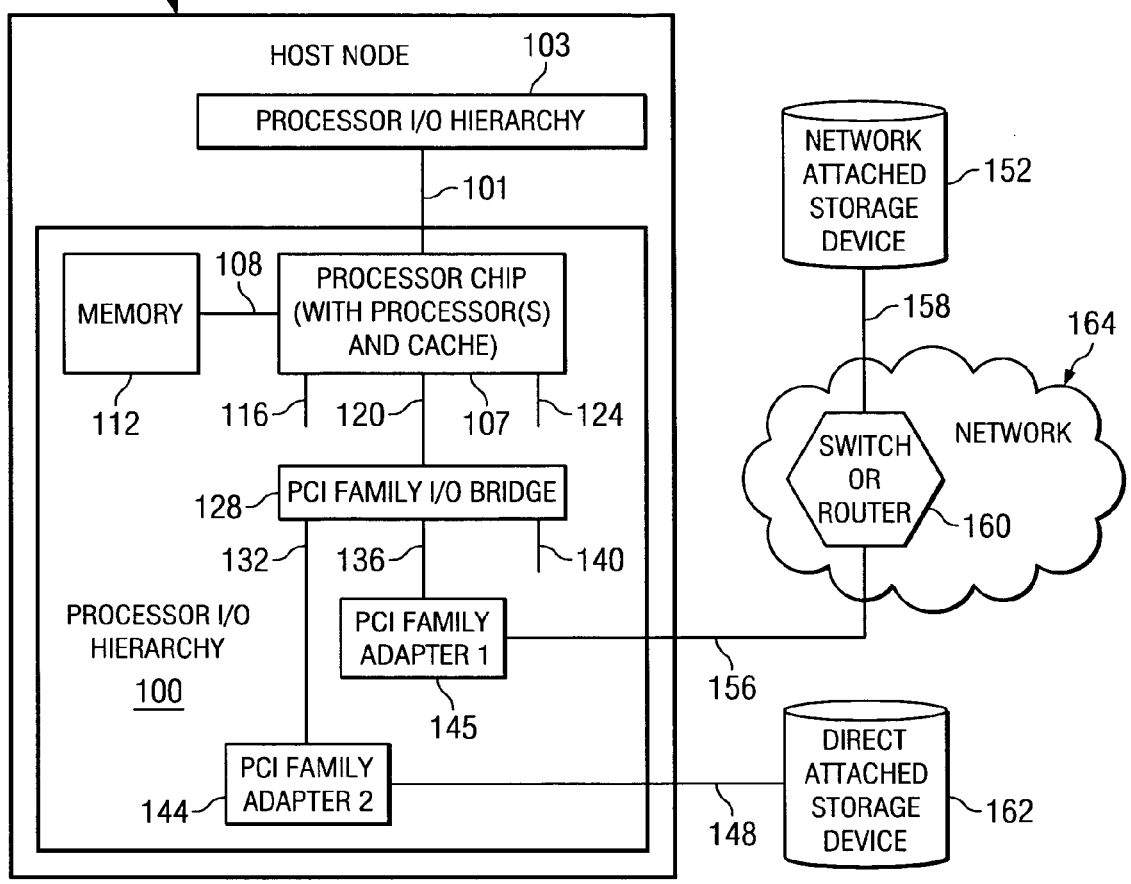
FIG. 1 is a functional block diagram of a host processor node in accordance with an exemplary embodiment of the present invention.

The present invention applies to any general or special purpose host that uses an I/O adapter, such as a PCI family I/O adapter, virtual I/O adapter, endpoint device, virtual endpoint device or the like, to directly attach storage or to attach storage through a network. The network may consist of endnodes, switches, routers and links interconnecting these components. The network links may be Fibre Channel, Ethernet, InfiniBand, Advanced Switching Interconnect, another standard storage network interconnect, or a proprietary link that uses proprietary or standard protocols. While the depictions and description hereafter will make reference to particular arrangements of networks and host nodes, it should be appreciated that the following exemplary embodiments are only exemplary and modifications to the arrangements specifically depicted and described may be made without departing from the spirit and scope of the present invention.

It is important to note that the present invention can take the form of an entirely hardware embodiment, an entirely software embodiment or an embodiment containing both hardware and software elements. In an exemplary embodiment, the present invention is implemented in software, which includes but is not limited to firmware, resident software, microcode, and the like.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters are coupled to the system to enable the data processing system to become coupled to other data processing systems or remote printers or storage devices through intervening private or public networks. Modems, cable modem and Ethernet cards are just a few of the currently available types of network adapters that may be used with the present invention.

With reference now to the figures, and in particular with reference to FIG. 1, a functional block diagram of a host node is depicted in accordance with one exemplary embodiment of the present invention. In this example, host node 102 includes two processor I/O hierarchies 100 and 103 which are interconnected through link 101. For ease of depicting the elements of the host node 102, only processor I/O hierarchy 100 is completely depicted with processor I/O hierarchy 103 having a similar, although not depicted, arrangement of elements as discussed hereafter.

As shown, processor I/O hierarchy 100 includes a processor chip 107 which includes one or more processors and their associated caches. Processor chip 107 is connected to memory 112 through a link 108. One of the links on the processor chip, such as link 120, connects to a PCI family I/O bridge 128. The PCI family I/O bridge 128 has one or more PCI family (PCI, PCI-X, PCI-Express, or any future generation of PCI) links that are used to connect other PCI family I/O bridges or a PCI family I/O adapter, such as PCI family adapter 1 145 and PCI family adapter 2 144, through a PCI link, such as links 132, 136, and 140. A PCI family adapter, such as PCI Family Adapter 1 145, may be used to connect to a network attached storage 152 through a network link, such as link 156 to network 164, that connects to either a switch or router 160, which in turn connects to the network attached storage 152 via link 158. A PCI family adapter, such as PCI family adapter 2 144, may also be used to connect a direct attached storage device 162 through a link 148.

It is important to note that a PCI Family Adapter, such as PCI Family Adapter 1 145 or PCI Family Adapter 2 144, may be integrated with other components on the host node 102. For example, PCI family adapter 1 145 or PCI family adapter 2 144, may be integrated with PCI family I/O bridge 128. Another example is that the PCI family adapter, such as PCI family adapter 1 145 or PCI family adapter 2 144, may be integrated with processor chip 107.

While the exemplary embodiments of the present invention will be described with regard to a PCI family adapter, it should be appreciated that the present invention is not limited to this type of adapter. Rather, the physical I/O adapter may be any type of I/O adapter including a PCI family adapter, a virtual I/O adapter, an endpoint device, a virtual endpoint device, a virtual I/O adapter endpoint device, or the like. One example of a virtual I/O adapter that may be used with the present invention is described in, for example, commonly assigned and co-pending U.S. patent application Ser. No. 11/065,829 entitled "Data Processing System, Method and Computer Program Product for Creation and Initialization of a Virtual Adapter on a Physical Adapter that Supports Virtual Adapter Level Virtualization, filed on Feb. 25, 2005, which is hereby incorporated by reference. Other types of I/O adapters may be used without departing from the spirit and scope of the present invention.

Figure 2:
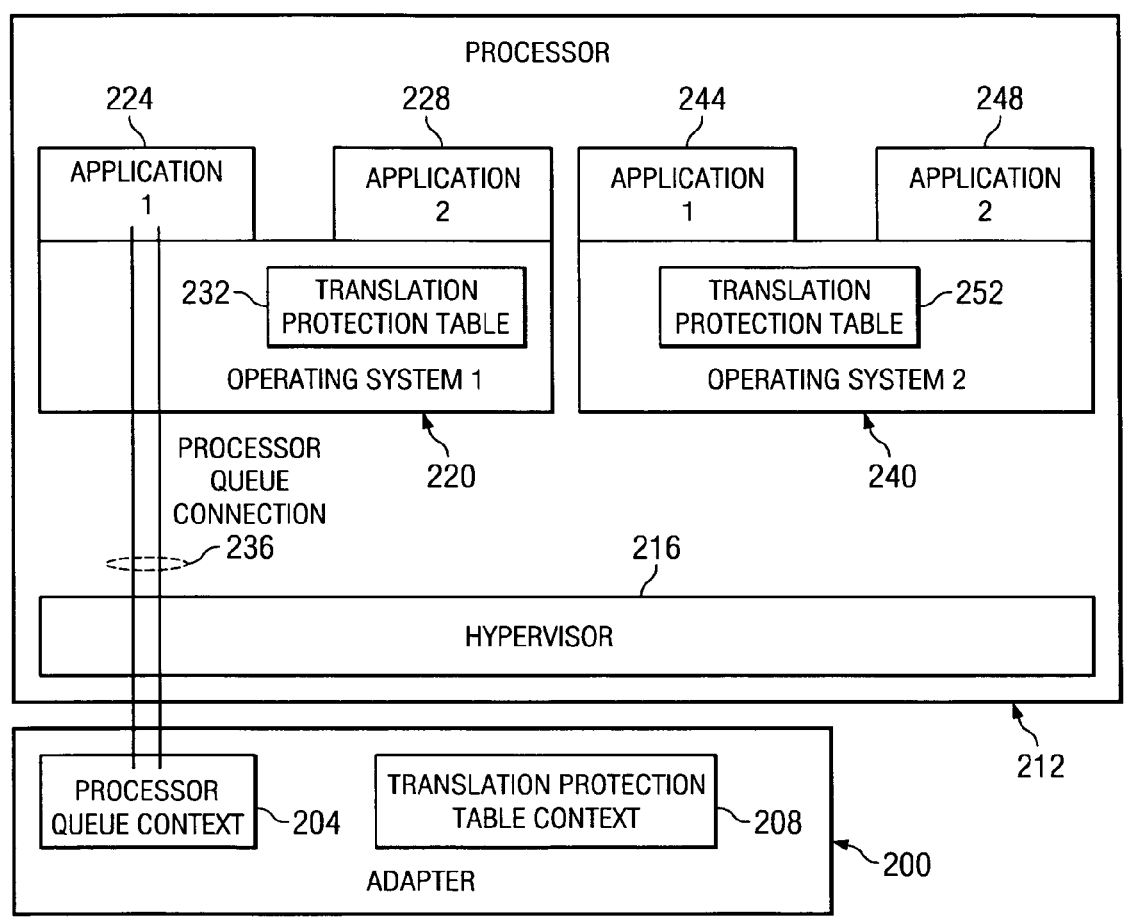
FIG. 2 is a diagram illustrating the primary operational elements of a host processor node used to enable out of user space block mode storage I/O access in accordance with an exemplary embodiment of the present invention.

With reference now to FIG. 2, a functional block diagram of system components associated with one exemplary embodiment of the present invention is depicted. In the depicted example, physical I/O adapter 200 is an example of a PCI adapter, such as PCI family adapter 1 145 or PCI family adapter 2 144 in FIG. 1.

In this example, physical I/O adapter 200, shown in FIG. 2, includes one set of processing queues (PQs), such as processing queue set 236, and their associated processing queue context, such as PQ context 204. The processing queues (PQs) may include, for example, a work queue, such as a send queue and or receive queue, and a completion queue. The work queue is used to submit linear block address (LBA) based I/O storage requests, also referred to herein as "block mode I/O storage requests," directly to the physical I/O adapter. A Linear Block Address (LBA) is the index of a block, i.e. a fixed size portion of a storage device, from the logical beginning of the storage device. The completion queue is used to communicate completion of a work queue entry back to the application instance that submitted the block mode I/O storage request.

The physical I/O adapter 200 also has a translation and protection table context, such as TPT context 208, which is used to contain the context for a host resident translation and protection table, such as TPT 232 or TPT 252. The TPT context 208 may also be used to contain the TPT 232 or 252 itself or a cache of entries from the host resident TPT 232 or TPT 252.

TPT 232 and 252 reside in an Operating System (OS), such as OS 1 220 or OS 2 240. The OS, e.g., OS 1 220 or OS 2 240, may reside above a hypervisor 216, which is software, firmware or a mix of the two that manages the partitioning and virtualization of physical hardware resources and controls the OS execution. The OS may host one or more middleware or application instances. In FIG. 2, OS 1 220 is hosting two middleware or application instances App 1 224 and App 2 228. Similarly, OS 2 240 is hosting application App 1 224 and App 2 228. The OS runs on a processor, such as processor 212.

A middleware or application instance, such as App 1 224 uses a set of processing queues, such as processing queue set 236, to pass block mode I/O storage requests to the physical I/O adapters. The block mode I/O storage requests may be constructed as a SCSI command, as an ATA storage command, or the like. When the physical I/O adapter 200 processes a block mode I/O storage request, the physical I/O adapter 200 uses a key passed in the block mode I/O storage request to look up an entry in the TPT context 208. If the TPT context 208 is associated with the same protection domain as the PQ Context 204, used for the processing queue, then the block mode I/O storage request is processed. Otherwise, the block mode I/O storage request is completed in error.

Figure 3:
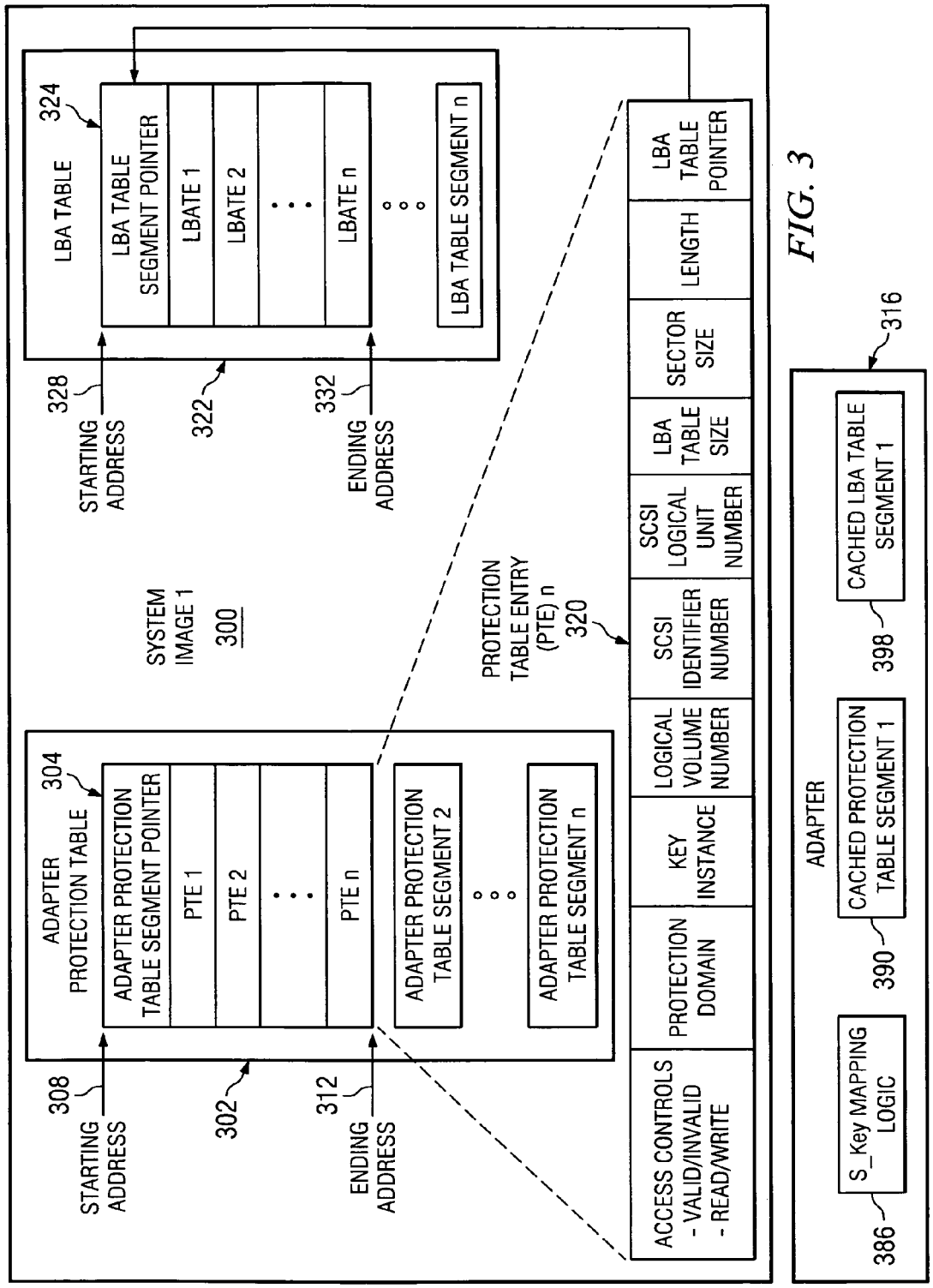
FIG. 3 is a diagram illustrating exemplary control structures used to translate and protect block mode storage in accordance with an exemplary embodiment of the present invention.

Turning next to FIG. 3, an example of a linear block address (LBA) translation and protection table (TPT) is depicted. Two tables are shown in FIG. 3: the adapter protection table 302, and the Linear Block Address (LBA) table 322, which together constitute a block storage translation and protection table. The adapter protection table 302 contains an entry for each logical volume, if logical volume based block mode I/O storage is used, or SCSI Logical Unit Number (LUN) if SCSI LUN block mode I/O storage is used. Each of these entries describes the access controls and a pointer to the Linear Block Address (LBA) table 322, which contains the range of LBAs associated with a corresponding adapter protection table entry. In the depicted example, the adapter protection table 302 contains entries for each logical volume (LV) and thus, the adapter protection table 302 is an LV adapter protection table 302. Entries in the adapter protection table 302 are created in response to a user space operation for creating a protection table entries in a similar manner as LBA table entries are created, as discussed in greater detail hereafter with reference to FIGS. 6 and 10.

The adapter protection table 302 may be segmented into a set of adapter protection table segments, such as adapter protection table segment 1 304. The segments may be interconnected using several data structures, including a B-tree, a tree made up of pointers in non-leaf nodes and pointers in leaf nodes, simple linked list, or the like. In the depicted example, adapter protection table segment 1 304 uses a simple linked list where the first entry in the table is a pointer to the next table that contains adapter protection table entries.

Protection table entry N 320 depicts an example entry in the adapter protection table segment, such as adapter protection table segment 1 304. Each entry in the adapter protection table segment 1 304 contains a set of fields that are used to define that entry. Protection table entry N 320 contains the following fields: Access Controls, Protection Domain, Key Instance, Logical Volume Number, SCSI Identifier Number, SCSI Logical Unit Number, LBA Table Size, Sector Size, Length, LBA Table pointer.

The adapter's S_Key mapping logic 386 performs all the checks of the fields in the protection table entry, e.g., protection table entry N 320. Any checks that are not passed by the S_Key mapping logic 386, result in an operation being completed in error. In the event of an error, the OS may either tear down the middleware or application instance that passed in the operation or take a less drastic measure, such as returning the operation with an error completion.

The Access Controls field describes whether the entry is valid or not and what type of operations may be performed on the entry. The possible operations that may be performed on the entry are: Read, Write, and Read/Write. If the block mode I/O storage request passed in by the middleware or application instance accesses a valid protection table entry, then the operation passes the valid/invalid check. If the block mode storage I/O request passed in by the middleware or application instance attempts to perform a Read access operation and the protection table entry has the valid bit set, then the operation passes this check. If the block mode storage I/O request passed in by the middleware or application instance attempts to perform a Write access operation and the protection table entry has the Read/Write bit set, then the operation passes this check.

The Protection Domain field is used to associate an adapter protection table entry with a PQ context. That is, if the PQ context, used by the middleware or application instance to pass in a block mode storage I/O requests, contains the same value in its protection domain field as the protection domain field of an adapter protection table entry, then the two are associated and the operation passes this check. If there is a mismatch between these protection domains in the PQ context and the adapter protection table entry, then the operation fails this check.

The Key Instance is used to compare the storage key passed in a block mode I/O storage request by the middleware or application instance to the storage key stored in the adapter protection table entry. If the two match, the operation passes this check. If the Key Instance does not match the storage key passed in the block mode storage I/O request, then the operation does not pass this check.

The storage key, or "S_Key", has two fields—a first field is an index into the adapter protection table and the second field is a key instance which is to be compared with a key instance in the adapter protection table entry that is pointed to by the first field. When the middleware or application instance submits a block mode I/O storage request, the adapter uses the first field to obtain an entry from the adapter protection table. The adapter then compares the key instance inside the adapter protection table entry with the second field that was passed in by the middleware or application instance.

The Logical Volume Number is optional and, if included, it is used to compare the LV number passed in a block mode storage I/O request by the middleware or application instance to the LV number stored in the adapter LV protection table entry. If the two match, the operation passes this check. If the Logical Volume Number does not match the LV number passed in by the block mode storage I/O request, then the operation fails this check.

The SCSI Identifier Number (ID) and SCSI Logical Unit Number (LUN) are used to associate the entry with a specific SCSI device and a specific LUN within that device, respectively.

The LBA Table Size is used to define the maximum number of entries each LBA table segment that is associated with the adapter protection table entry, such as LBA table segment 1 324, may contain. The Sector Size is used to define the size of each sector on the disk associated with the adapter protection table entry. The Length field is used to define the total length of the set of disk LBAs associated with the adapter protection table entry.

The LBA Table Pointer of the protection table entry 320 points to one or more corresponding LBA table entries in the LBA table 322. Thus, with the LBA Table Pointer field, the linear block addresses associated with a protection table entry in the adapter protection table 302 may be identified in order to provide access to linear block addresses of storage locations on the physical storage device associated with the processor queue from which a block mode I/O request is received in the adapter 316.

The LBA table 322 may also be segmented into a set of LBA table segments, such as LBA table segment 1 324. The segments may be interconnected using several data structures, including a B-tree, a tree made up of pointers in non-leaf nodes and pointers in leaf nodes, a simple linked list, or the like. In the depicted example, LBA table segment 1 324 uses a simple linked list where the first entry in the table is a pointer to the next table that contains LBA table entries.

Each entry in the LBA table segment, such as LBA table segment 1 324, describes the range of disk Linear Block Addresses (LBAs) associated with that entry. For this description, the entry may use a starting LBA and a length, a starting LBA and an ending LBA, or the like.

The physical I/O adapter, such as adapter 316, may choose to store the entire adapter protection table, a portion of the adapter protection table, or none of the adapter protection table. Adapter 316 is shown with an adapter protection table cache that holds one segment, such as cached protection table segment 1 390.

Similarly, the adapter 316 may choose to store the entire LBA table, a portion of the LBA table, or none of the LBA table. In the depicted example, adapter 316 is shown with an LBA table cache that holds one segment, such as cached LV LBA table segment 1 398.

Figure 4:
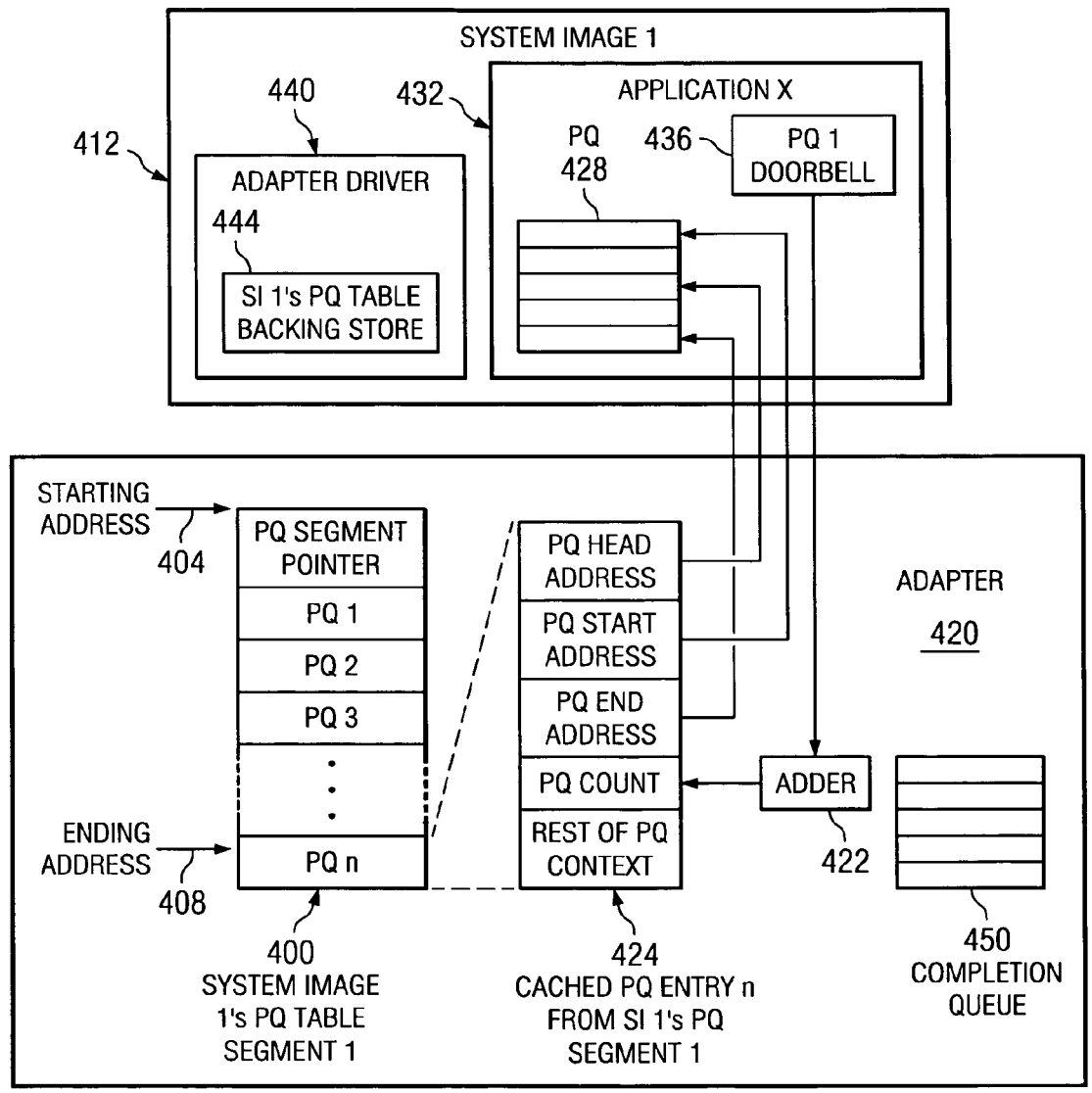
FIG. 4 is a diagram illustrating exemplary control structures used to pass a storage request from a user space middleware or application instance to a storage adapter in accordance with an exemplary embodiment of the present invention.

With reference next to FIG. 4, an exemplary diagram of exemplary control structures used to pass a block mode I/O storage request for a user space middleware or application instance to a physical I/O adapter in accordance with an exemplary embodiment of the present invention is shown. For illustration purposes, a system image, which may be an operating system, such as Windows XP™, AIX™, Linux™, etc., or a special purpose software image, such as a block mode I/O storage server or file mode I/O storage server, for example, is shown with an application that uses a storage or network adapter to invoke storage operations from a storage device. For purposes of the following description, the terms "system image" and "operating system" may be used interchangeably to refer to a system image, i.e. the current contents of system memory, which may include the operating system and any running application instances.

The system image, such as system image 1 412, has a device driver, such as adapter driver 440, associated with the storage adapter 420. The adapter driver 440 may contain a processing queue (PQ) table backing store 444 which contains copies of the entries in the adapter's PQ table, e.g., system image 1's processing queue table segment 1 400.

When application instance X 432 performs a block mode I/O access, the application instance informs the associated adapter 420 through the use of a processing queue (PQ) doorbell 436. For example, PQ 1 Doorbell 436 informs the adapter 420 that there is a storage work request in the send queue 428 of the processing queue set used to communicate between application instance X 432 and adapter 420.

The data from PQ 1 Doorbell 436 provides the number of work requests that need to be added by an adder 422 to the current number of pending work requests in the adapter 420. That is, a block mode I/O request sent generated by middleware or an application instance may be comprised of a plurality of actual work requests that are stored in the send queue as work queue entries. The PQ 1 Doorbell 436 identifies the number of work requests that are part of the block mode I/O request.

The number of work requests is provided as a PQ Count field that is stored in the associated processing queue table entry PQ N associated with the system image, such as cached PQ entry N from system image 1's PQ Segment 1 424. Once the storage work request is completed, a message is added to a completion queue 450 which is used to inform the application that the work request has been completed.

As shown in FIG. 4, the cached PQ entry N from system image 1's PQ segment 1 424 includes PQ context information including a PQ head address, PQ start address, PQ end address, PQ count, and additional PQ context information. The PQ start address field stores the system memory address of the first work queue entry in the application's processor queue 428. The PQ End address field stores the last system memory address that is associated with the last work queue entry of the processor queue 428. The PQ head address field stores the system memory address of the next processor queue entry that the adapter is going to process. The adapter changes the PQ head address as it processes processor queue entries in the circular processor queue. The PQ count field stores the number of processor queue entries that have not been processed by the adapter yet, but have been posted by the application instance 432.

Figure 5:
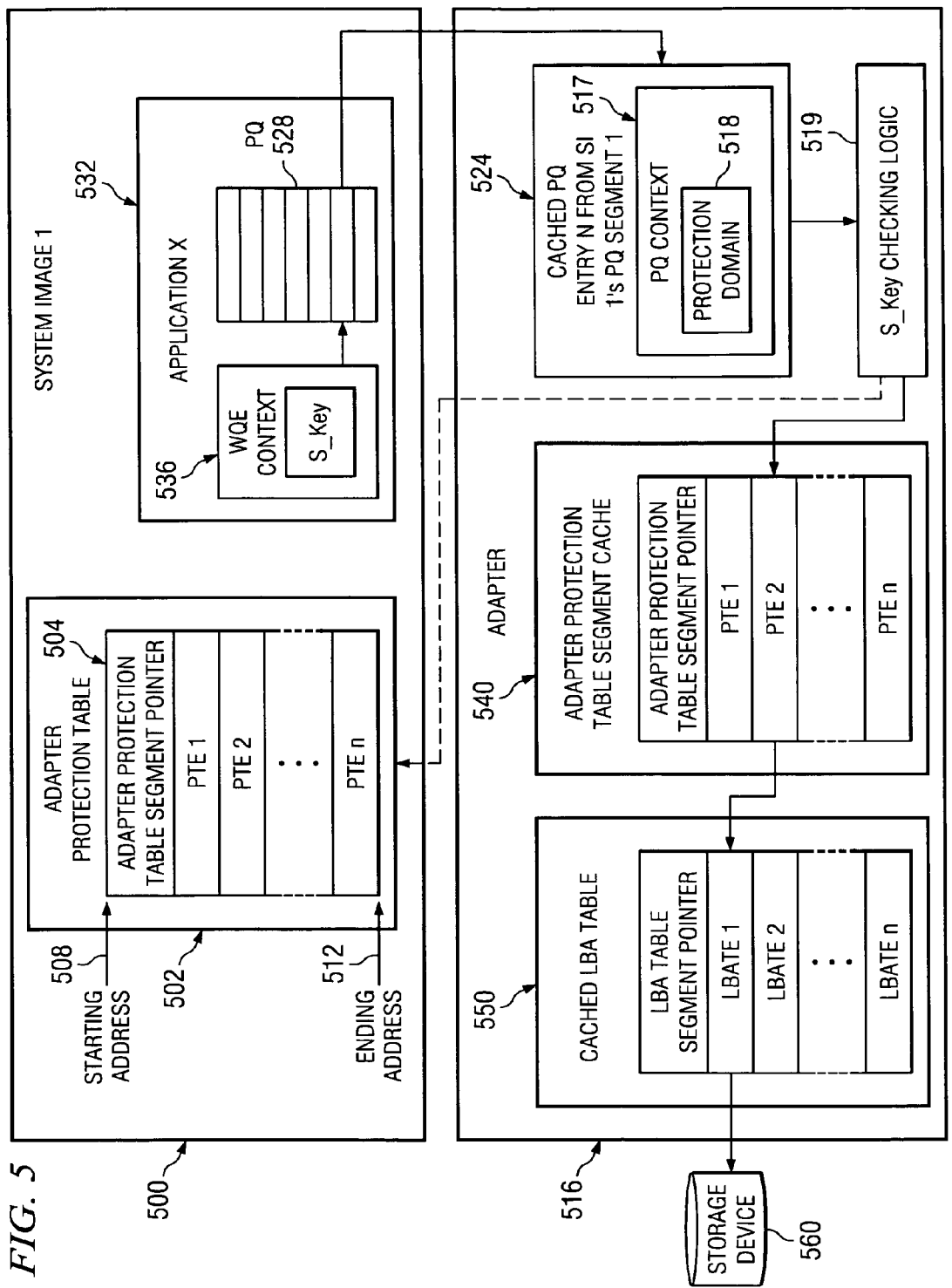
FIG. 5 is a diagram illustrating exemplary control structures used to assure that a block mode storage I/O request submitted by a user space middleware or application instance is allowed to reference the storage device areas referenced in the block mode storage I/O request in accordance with an exemplary embodiment of the present invention.

With reference next to FIG. 5, a description of exemplary control structures that are used to assure that a block mode I/O storage request, submitted by a user space middleware or application instance, is authorized to reference the storage device areas referenced in the block mode I/O storage request, in accordance with one exemplary embodiment of the present invention, is provided. FIG. 5 focuses on the protection of the storage blocks associated with the application instance, by ensuring that only the application instance associated with those storage blocks is the only application instance that may access those storage blocks on the storage devices.

As shown in FIG. 5 a system image 1 500 hosts an application instance X 532. This application instance X 532 performs a block mode I/O storage request using the mechanism described above with reference to FIG. 4. This mechanism uses a processing queue to submit block mode I/O storage requests to the desired physical I/O adapter, such as adapter 516. A block mode I/O storage work request is put into the send queue 528 which is a work queue that is part of the processing queue set associated with application instance X 532 and adapter 516. The processing queue context 517 on the adapter 516, such as that in the cached PQ entry N from system image (SI) 1's PQ Segment 1 524, contains a protection domain field 518.

When the application X 532 submits a block mode I/O storage request, such as block mode I/O storage request 536, part of the request will contain an S_Key. The S-Key is used by the adapter 516 to access a segment of the adapter protection table 502. This accessing of a segment of the adapter protection table 502 may involve accessing a cached adapter protection table segment 540 if the required segment is present in the adapter's protection table segment cache 550. If the required adapter protection table segment is not present within the adapter's protection table segment cache 550, a loading of the required adapter protection table segment, e.g., adapter protection table segment 504, from the system image 500 into the adapter's protection table segment cache 550 may be required, for example. Alternatively, the S_Key checking logic 519 may access the adapter protection table segment, e.g., adapter protection table segment 1 504, in the system image 500 directly.

The S_Key is used to lookup an entry in the adapter protection table segment 1 504, or cached adapter protection table segment 540, associated with the S_Key. For example, the S_Key may be compared against the key instance fields of the adapter protection table entries in the adapter protection table segment 504/540 to identify an entry that matches the S_Key.

S_Key checking logic 519 in the adapter 516 will then perform a protection domain check to verify that the protection domain coming from the PQ context 524 in adapter 516 matches the protection domain in the protection table entry N 520 that is pointed to by the S_Key in the block mode I/O storage request 536. Any checks that are not passed by the S_Key checking logic 519, result in an operation being completed in error. In such a case, the operating system, e.g., system image 1 500, may either tear down the middleware or application instance, e.g., application instance X 532, that passed in the operation, or take a less drastic measure, such as returning the operation with an error completion.

Assuming that all of the checks previously discussed above are passed, the block mode I/O storage request is processed by the adapter 516 to either read, write or read/write data to/from the linear block addresses of the physical storage device 560, e.g., the hard disk, referenced by the entry in the cached LBA table segment 550, or alternatively the LBA table segment (not shown) associated with the system image 500, corresponding to the adapter protection table entry.

The present invention uses the adapter protection table and LBA table to manage the "user space" and "out of user space" block mode I/O operations. User space is the portion of system memory used to run user applications. Block mode I/O operations that are performed in "user space" include operations regarding the creation, modification, querying and deletion of LBA table entries, the submission and processing of work queue requests by applications, other I/O operations performed by a system image, and the like. With regard to the present invention, block mode I/O operations that are performed "out of user space" include operations performed in the I/O adapter to facilitate validation and execution of I/O requests to physical storage devices.

The data structures and mechanisms described above are used to control access to portions of storage by applications during linear block address (LBA) based direct I/O operations, or simply block mode I/O operations, between the application instance and the physical I/O adapter. The following description provides details regarding the way in which resources are allocated, work queue entries are created, and completion queue entries are processed in accordance with the mechanisms previously described above.

Figure 6:
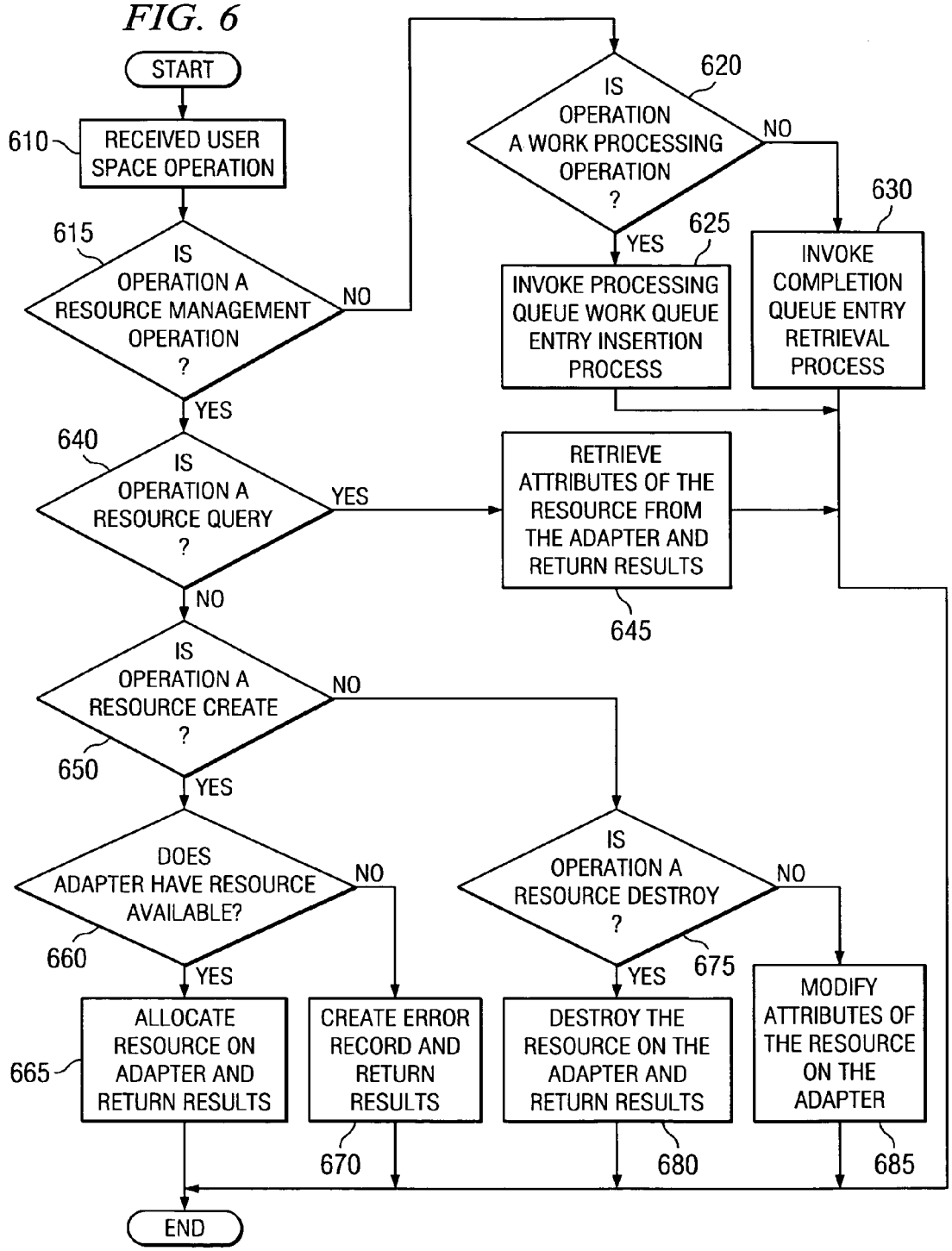
FIG. 6 is a flowchart outlining an exemplary operation for handling an invocation of a user space operation in accordance with an exemplary embodiment of the present invention.

FIG. 6 is a flowchart outlining an exemplary operation for handling an invocation of a user space operation in accordance with an exemplary embodiment of the present invention. In an exemplary embodiment of the present invention, the operations outlined in FIG. 6 are performed by a system image or operating system in response to an invocation of a user space operation. While the exemplary embodiments have these operations being performed in a system image or operating system, the present invention is not limited to such. Rather, for example, the operations may be performed in a user space application, a hypervisor, or the like.

It will be understood that each block, and combination of blocks, of the flowchart illustration in FIG. 6, and the flowchart illustrations in subsequent figures described hereafter, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

As shown in FIG. 6, the operation starts with an invocation of a user space operation (step 610). This invocation may be performed, for example, by way of a user management interface, an automated script/workflow, or the like. The invocation may be made via an application instance, the system image, or the like. One example of a user management interface which may perform such an invocation is the raw mode I/O in the Advanced Interactive Executive (AIX) operating system. Other operating systems may have similar interfaces. This user management interface is invoked for management operations like create volume, destroy volume as well as functional operations such as read or write.

A determination is made as to whether the user space operation that is being invoked is a resource management operation (step 615). The operating system is there to restrict access to the underlying hardware so that an application cannot access resources associated with another application. Thus, a resource management operation is one that must be performed by the operating system because there is no other alternative for restricting the application's access to the resources it owns. Examples of such operations include create volume, query volume, destroy volume. A non-resource management operation is one where, through the mechanisms of the present invention, a physical adapter can restrict the application's access to the resources it owns. Examples of non-resource management operations are read and write operations.

If the operation is not a resource management operation, then the operation is a processor queue processing operation. As a result, a determination is made as to whether the operation is for work queue processing, e.g., processing associated with an entry in a send queue (step 620). If so, a work queue entry insertion process is invoked for creating a work queue entry (step 630). This work queue entry insertion process is used to submit work requests to the I/O adapter as discussed previously and outlined hereafter in FIG. 7.

If the operation is not for work queue processing, then a completion queue entry retrieval process is invoked (step 630). The completion queue entry retrieval process is used to retrieve completion queue entries from the physical I/O adapter for work requests that have been completed by the physical I/O adapters, as described in greater detail hereafter.

If the user space operation is a resource management operation (step 615), then a determination is made as to whether the operation is a resource query operation (step 640). If the operation is a resource query operation, then the system image/operating system retrieves the attributes of the resource from the physical I/O adapter and returns the results to the element, e.g., system image or application instance, that invoked the user space operation (step 645). This operation is used to obtain attribute information from, for example, LBA table entries and adapter protection table entries, as discussed in greater detail hereafter.

If the operation is not a resource query operation, then a determination is made as to whether the operation is a resource create operation (step 650). If the operation is a resource create operation, a determination is made as to whether the physical I/O adapter has resources available to allocate to the element invoking the user space operation (step 660). For example, as discussed above, each adapter protection table entry in the adapter protection table contains a LBA table size, sector size and length. These parameters may limit the number of resources available by the adapter for allocation. Thus, the physical I/O adapter may determine that sufficient resources are not available for allocation to the element invoking the user space operation.

If there are sufficient resources available to allocate, then these resources are allocated on the physical I/O adapter and the physical I/O adapter returns the results of this allocation to the invoking element (step 665). If there are not sufficient resources available to allocate, then an error record may be generated and returned to the element invoking the user space operation (step 670).

If the operation is not a resource create operation (step 650), then a determination is made as to whether the operation is a resource destroy operation, also referred to herein as a "delete" or "de-allocation" operation (step 675). If the operation is a resource destroy operation, then the resource is destroyed on the physical I/O adapter and the results of the operation are returned to the element invoking the user space operation (step 680). If the operation is not a resource destroy operation, then the operation is a resource modify operation and the attributes of the designated resource are modified on the physical I/O adapter (step 685). The operation then terminates.

Figure 7:
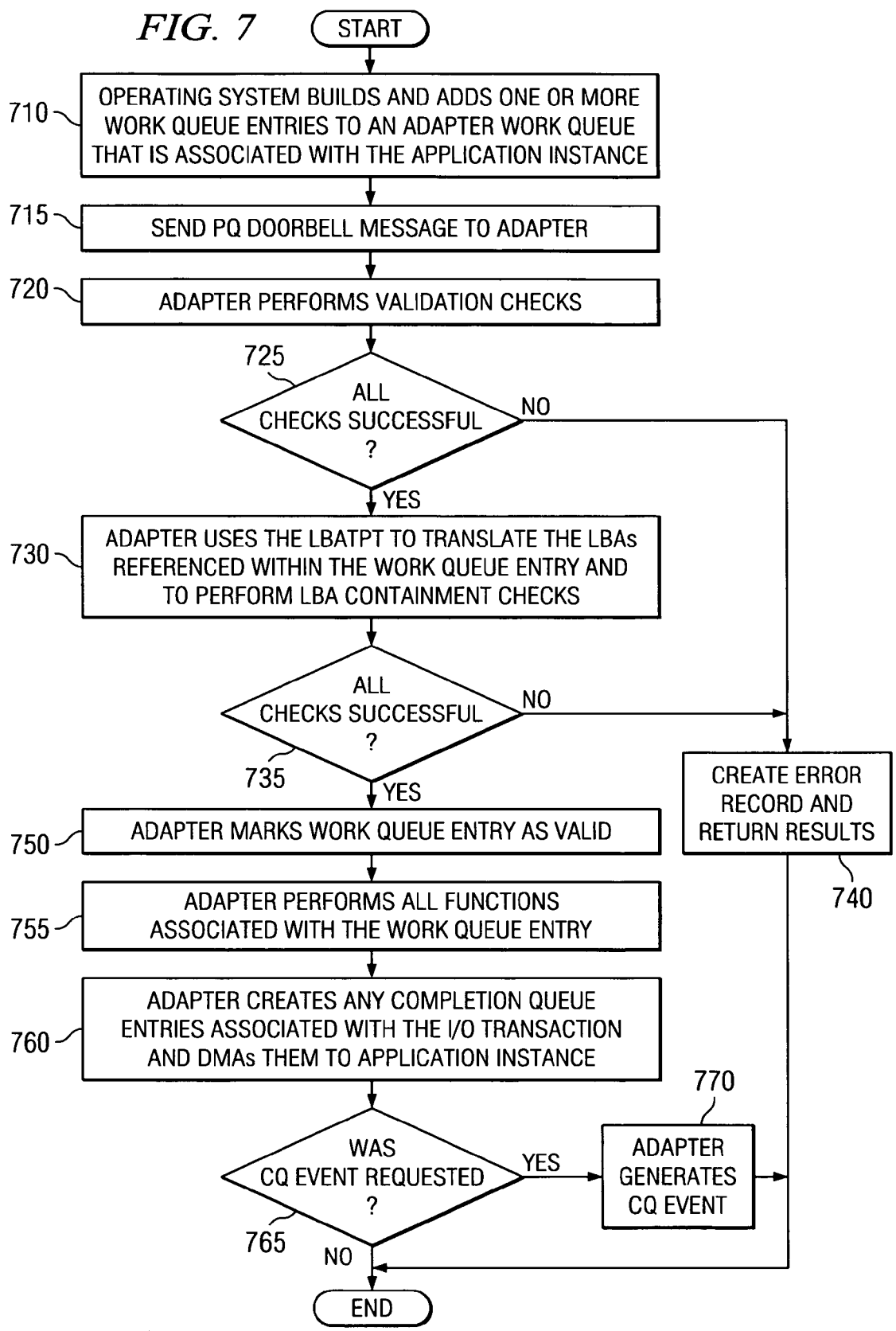
FIG. 7 is a flowchart outlining an exemplary operation of one exemplary embodiment of the present invention when an invoked user space operation is a work queue operation requiring generating and processing or work queue elements.

FIG. 7 is a flowchart outlining an exemplary operation of the present invention when an invoked user space operation is a work queue operation requiring generating and processing or work queue elements. The operation shown in FIG. 7 corresponds to step 625 in FIG. 6, for example.

As shown in FIG. 7, the operation starts when the application instance adds one or more work queue elements to a work queue, e.g., send queue, of a processor queue set associated with the application instance and adapter (step 710). As discussed above, this work queue entry includes an S_Key, a protection domain, an identifier of the I/O operation that is to be performed, and optionally a logical volume number and SCSI LUN.

A processing queue doorbell message is sent from the application instance to the physical I/O adapter to inform the physical I/O adapter of the newly posted work request (step 715). In one exemplary embodiment of the present invention, the sending of the processor queue doorbell message involves performing a programmed I/O write to a doorbell address associated with the work queue. As discussed above, the doorbell message is used to add additional work requests to the processor queue count in the cached processor queue entry of the physical I/O adapter.

Thereafter, the physical I/O adapter performs validation checks of the information stored in the work queue entry or entries against the data stored in the adapter protection table entries (step 720). As discussed above, these checks may include, for example, checking for matches between protection domains, logical volume numbers, SCSI identification numbers, SCSI logical unit numbers, and the like. These checks will be described in greater detail hereafter.

A determination is made as to whether all of the checks are completed successfully. (step 725). If all of the checks complete successfully, the physical I/O adapter uses the LBA table to translate the LBAs referenced within the work queue entry and performs LBA containment checks (step 730). Because the application instance operates in a different space than the storage device, the addresses referenced by the block mode I/O storage request generated by the application instance may differ from the actual physical addresses of the storage device. The LBA table entries provide information regarding the actual physical LBAs for the storage device that are allocated to a particular application instance, as determined from the corresponding adapter protection table entry. Thus, a mapping between the LBAs referenced in the block mode I/O storage request, and thus the work queue entries, and the LBAs referenced in the LBA table may be performed in order to determine the actual physical LBAs to which the block mode I/O operations are to be directed.

For example, the LBA table pointer in the adapter protection table entry may be used to access one or more entries in the LBA table that correspond to the adapter protection table entry. From the LBA table entries corresponding to the adapter protection table entry, the range of disk Linear Block Addresses (LBAs) corresponding to the adapter protection table entry may be identified. These LBAs may then be used to map the LBAs referenced in the work queue entry to LBAs of the physical storage device.

Returning to FIG. 7, a determination is made as to whether the LBA containment checks complete successfully (step 735). These LBA containment checks are checks to determine if the mapped LBAs in the block mode I/O operations, and thus the work queue entry, fall within the LBAs allocated to the application instance as identified in the corresponding LBA table entry. For example, if the application instance is attempting to access portions of the storage device that are not allocated to that application instance, then at least one of the LBA containment checks will fail. If any of the validation checks or the containment checks are not completed successfully, an error result is generated (step 740).

If the validation and containment checks complete successfully, the physical I/O adapter marks the work queue entry as valid (step 750) and performs all functions, e.g., read, write, read/write, associated with the work queue entry (step 755). Thereafter, or after the generation of an error result in step 740, the physical I/O adapter creates a completion queue entry associated with the work queue entry and performs a direct memory access (DMA) operation to send the completion queue entry to the application instance (step 760).

A determination is then made as to whether a complete queue event was requested (step 765). If so, the physical I/O adapter generates a completion queue event (step 770) and the operation terminates. That is, after work requests that were posted to the send and receive queues of the processor queue are completed, a completion message is put into the completion queue and if the application requests it, an event may be generated.

It is important to note in FIG. 7 that after steps 710 and 715, the system image or operating system is not involved in the processing of the work queue entry. To the contrary, the adapter performs all of the necessary operations for performing the validity and containment checks, performing the functions associated with the work queue entry, generating a completion queue entry, and sending the completion queue entry to the host. Thus, the many task switches experienced in known systems during an I/O operation, as described in the Background of the Invention above, are avoided by the present invention since it is not necessary to involve the operating system or system image during the actual checking and processing of the I/O operation after it has been submitted by the operating system or system image. The operating system or system image is only again utilized to retrieve a completion queue entry associated with the work queue entry that was processed, and pass this completion queue entry to the application.

Exemplary validation checks that are performed to determine if a work queue entry is valid and may be processed by the physical I/O adapter are illustrated in FIG. 8. The validation check operation outlined in FIG. 8 may correspond, for example, to steps 720 and 725 in FIG. 7.

As shown in FIG. 8, the operation starts by retrieving the next work queue entry for the block mode I/O operation from the work queue, e.g., send queue (step 810). This work queue entry is then checked against a cached or system image resident adapter protection table entry to determine if the corresponding block mode I/O operation can be performed. First, the S_Key in the work queue entry is used to lookup an adapter protection table entry corresponding to the S_Key (step 820). For example, the S_Key in the work queue entry is compared against the key instance in the adapter protection table entries to identify an adapter protection table entry that corresponds to the work queue entry. Not all work queue entries from the same application instance will necessarily have the same S_Key. Whether or note the same S_Key is used with all work queue entries is dependent upon the particular application. For example, if the application has only one entry in the adapter protection table, then all reads and writes will go to that same adapter protection table entry. However, if the application has multiple entries in the protection table, then there will be multiple S_Keys with each S_Key being unique to each entry.

A determination is made as to whether a valid adapter protection table entry has been found by the above lookup operation (step 830). If not, an error result is generated and returned (step 840). As mentioned above, this error result may be, for example, tearing down the middleware or application instance that passed in the work request that generated the work queue entry, or may take a less drastic measure such as returning the operation with an error completion.

If a valid adapter protection table entry has been found, a check is then made as to whether the I/O operation that is to be performed in association with the work queue entry is supported by the associated adapter protection table entry (step 850). For example, the access controls of the adapter protection table entry are compared against the I/O operation identifier in the work queue entry to determine if the adapter protection table entry indicates that the I/O operation may be performed or not.

If the I/O operation cannot be performed based on the setting of the access controls in the adapter protection table entry, then the operation generates and returns an error result (step 840). If the I/O operation can be performed as indicated by the adapter protection table entry, then a determination is made as to whether the protection domain of the work queue entry corresponds to the protection domain of the adapter protection table entry (step 860). If the protection domains do not match, then the operation generates and returns an error result (step 840). If the protection domains do match, and the work queue entry has an associated LV number identifier and/or a SCSI LUN identifier, then additional checks of this information are made (steps 870). As with the previous checks, if these checks result in a mismatch between the work queue entry and the adapter protection table entry, then an error result is generated and returned (step 840).

If all checks are passed, the work queue entry is preliminarily marked as a valid work queue entry that may be processed by the physical I/O adapter (step 880). This preliminary marking of validity only means that the work queue entry has passed the first set of validity checks. As described above, the work queue entry must also pass containment checks before being processed by the physical I/O adapter. Following step 880, the operation ends with regard to the validity checks but, as shown in FIG. 7, continues to step 730 or 740 in the overall operation.

It should be appreciated that while FIG. 8 illustrates a series of checks that are performed in order to process a block mode I/O operation, the present invention is not limited to the particular series of checks depicted. To the contrary, the operation outlined in FIG. 8 is only exemplary and many modifications may be made without departing from the spirit and scope of the present invention. For example, the order in which the various validity checks are performed may be modified as needed such that a different series of validity checks is performed having a different order of operations.

FIG. 9 is a flowchart outlining an exemplary operation of the present invention when the invoked user space operation is a completion queue retrieval process operation. The operation shown in FIG. 9 corresponds to step 630 in FIG. 6, for example.

As shown in FIG. 9, the operation starts by polling the completion queue to determine if there are any completion queue entries ready to be processed (step 910). A determination is made as to whether any completion queue entries are ready to be processed (step 920). If not, a null result is returned to the user space application (step 930). If there are completion queue entries ready to be processed, the next completion queue entry is returned to the user space application (step 940) and the operation terminates.

It should be noted that the above operations described in FIGS. 6-9 are applicable to LBA based direct I/O operations in both non-virtual and virtual systems. In a virtual system, the only addition may be the invocation of the hypervisor, or other virtualization mechanism, by the operating system or system image to aid in maintaining a continuous range of virtual LBAs during resource creation, modification, querying or deletion.

As discussed above, with regard to the operation outlined in FIG. 6, the mechanisms of the present invention involve determining whether an invoked user space operation is directed to the creation, querying, modification or deletion of resource allocations for linear block address based direct I/O between the application and the adapter. Based on these determinations, various operations for creating, modifying, querying or deleting resource allocations may be invoked by the operating system or system image. Each of these operations will now be described, with reference to FIGS. 10-13, and with regard to the linear block address table of the present invention. It should be appreciated that the operations shown in FIGS. 10-13 may be performed for virtual and non-virtual systems. Thus, for example, the operations may be performed to create, modify, query and delete or destroy LBA entries based on logical volumes, SCSI identifier, or SCSI logical unit numbers.

Moreover, it should be appreciated that while the operations outlined in FIGS. 10-13 make reference to the creation, modification, querying and deletion of LBA entries, these same or similar processes may be used to generate adapter protection table entries as well. That is, in places within the flowcharts shown in FIGS. 10-13 where the LBA table entries are referenced, these portions of the flowcharts may be modified to reference adapter protection table entries to thereby adapt these operations to the creation, modification, querying and deletion of adapter protection table entries in accordance with an exemplary embodiment of the present invention.

FIG. 10 is a flowchart outlining an exemplary operation of the present invention when creating a LBA entry in an LBA table in accordance with an exemplary embodiment of the present invention. The operation outlined in FIG. 10 corresponds, for example, to step 665 in FIG. 6.

As shown in FIG. 10, the operation starts by receiving a user space operation that is a request to create one or more LBA entries, i.e. allocate a set of LBAs for direct I/O access by the application instance and/or system image (step 1010). In response to receiving the creation user space operation, the operating system or system image uses the physical I/O adapter's memory management interface to request that the physical I/O adapter create one or more LBA entries (step 1020). The memory management interface can be implemented several different ways. For example, the memory management interface may be a queue where resource management operations can be passed from the system image to the adapter.

A determination is then made as to whether the I/O adapter has sufficient resources to complete the request (step 1030). This determination may involve, for example, using the adapter protection table entry corresponding to the application instance, as determined by the S_Key mapping logic, to identify a LBA table segment associated with the application instance. A determination may then be made, based on the LBA table size, sector size, length, and current available space in the LBA table segment whether there are sufficient resources for allocating additional LBAs to the application instance.

For example, each LBA table segment can fit a fixed number of entries. When that number of entries is reached, a new LBA table segment needs to be added and linked via the LBA table pointer. The operating system, or system image, determines if there are free pages available that can be pinned and used to hold a new LBA table segment. If there are free pages available, the operating system or system image, uses those pages, pins them, and successfully completes the request; otherwise, the request fails. LBAs must also be available on the disk for use by the application instance. The operating system or system image determines if there are LBAs available on the disk that can be used by the application and if there are, the operating system or system image uses those LBAS, and references them through the LBA table segment entry; otherwise, the request fails.

If there are sufficient resources available to allocate the requested LBAS to the application instance, then a LBA entry is created in the LBA table segment corresponding to the application instance (step 1040). The LBA entry identifies the physical storage device LBAs that map to the LBAs requested by the application instance. The physical I/O adapter then returns the results of the creation user space operation to the application instance so as to inform the application instance of the LBAs that may be used by the application instance to perform block mode direct I/O to the physical I/O adapter (step 1050).

If there are not sufficient resources to allocate the requested LBAs, then the physical I/O adapter does not create the LBA entry (step 1060). The resulting error is then returned by the physical I/O adapter to the application instance as the results of the creation user space operation (step 1050). The operation then terminates.

FIG. 11 is a flowchart outlining an exemplary operation of the present invention when processing a user space operation that is a resource modify operation. The operation outlined in FIG. 11 may correspond, for example, to step 685 of FIG. 6.

As shown in FIG. 11, the operation starts by receiving, from an application instance, system image, or the like, a user space operation requesting modification of one or more LBA entries (step 1110). The system image then uses the physical I/O adapter's memory management interface to request that the physical adapter modify one or more LBA entries associated with the application instance or system image (step 1120). A determination is made as to whether the physical I/O adapter has sufficient resources to complete the modification request (step 1130). That is, while the protection table entry has a fixed set of fields and thus, an insufficient resources scenario will not apply to a protection table entry after it has been created, the LBA table segment can have additional entries added to it and, as described previously, there are scenarios where the LBA table segment may run out of resources. If there are not sufficient resources available to the physical I/O adapter to complete the modification request, the physical I/O adapter returns an error message to the application instance indicating an inability to complete the modifications (step 1140).

If there are sufficient resources available, a determination is made as to whether there are any active I/O transactions on the LBA entry that is being modified (step 1150). If there are active I/O transactions on the LBA entry that is being modified, the physical I/O adapter initiates a timer and waits for a quiescent point to be reached (step 1160). The quiescent point is a point at which there are no I/O transactions active on the LBA entry being modified. This check and waiting for a quiescent point are necessary so that modifications are not made to an LBA entry that would result in corruption of the system due to the active I/O transactions operating under the previous LBA entry attributes.

A determination is then made as to whether the quiescent point is reached before a timeout of the timer (step 1170). If not, an error message is returned to the application instance indicating an inability to complete the modifications (step 1140). If a quiescent point is reached before timeout of the timer, the physical I/O adapter modifies the attributes of the LBA entry (step 1180) and returns the attributes of the modified resource to the application instance (step 1190). The operation then terminates.

FIG. 12 is a flowchart outlining an exemplary operation of the present invention when processing a query user space operation. The operation outlined in FIG. 12 may correspond, for example, to step 645 of FIG. 6.

As shown in FIG. 12, the operation starts by receiving, from an application instance, the system image, or the like, a user space operation that requests a query of the attributes of an LBA entry (step 1210). In response to receiving this user space operation, the system image uses the adapter's memory management interface to request that the physical I/O adapter query one or more LBA entries (step 1220). The physical I/O adapter then returns the attributes of the LBA entry to the application instance (step 1230).

FIG. 13 is a flowchart outlining an exemplary operation of the present invention when processing a destroy or delete user space operation. The operation shown in FIG. 13 corresponds, for example, to step 680 of FIG. 6. An LBA table entry may be destroyed or deleted, for example, if the operating system or system image allows a logical volume to be reduced by the middleware or application instance. This reduction may then cause LBA entries to be destroyed or deleted, for example.

As shown in FIG. 13, the operation starts by receiving a destroy or delete user space operation (step 1310). In response to receiving the destroy or delete user space operation, the system image uses the physical I/O adapter's memory management interface to request that the physical I/O adapter destroy or delete one or more LBA entries (step 1320). A determination is made as to whether an I/O transaction is active on the LBA entry that is being deleted or destroyed (step 1330).

If an I/O transaction is active on the LBA entry, the physical I/O adapter initiates a timer and waits for a quiescent point to be reached (step 1340). A determination is then made as to whether the quiescent point is reached before the timer times out (step 1350). If not, the physical I/O adapter creates an error result and returns the error result to the application instance (step 1360). If the quiescent point is reached before the timer times out, or if there is no active I/O transaction on the LBA entry, the physical I/O adapter destroys or deletes the existing LBA entry (step 1370) and returns the result to the application instance (step 1380). When an LBA entry is destroyed or deleted by the operating system or system image, an entry is removed from the LBA table segment and the LBAs in the disk are freed and made available for use of other applications.

It should be noted that the operations outlined in the flowcharts described above make reference to the operations performed on the LBA table entries. In addition, changes to the LBA table may further require changes to the adapter protection table. For example, for the query operation, the operating system or system image will check if the middleware or application instance that submits the query request is associated by the adapter protection table entry referenced by the query operation. If so, the query is allowed; otherwise, an error is reported. During the creation and modification operations, the middleware or application instance requests the Read and Write Access Control field values and the Length field value that is to be stored in an associated protection table entry and the operating system or system image inserts these values into the appropriate fields of the adapter protection table entry along with the rest of the fields. During the delete or destroy operation, the operating system or system image destroys the associated LBA table segment(s) and then sets the access control fields of associated protection table entries to invalid.

Thus, with the present invention, an invoked user space operation is checked to see if the operation is a resource query, resource create, resource destroy, resource modify, work queue, or completion queue operation. Based on this determination, corresponding operations for querying, creating, destroying, and modifying resource allocations, work queue entries, and completion queue entries are performed. Thus, if an application requires resources in order to perform linear block address (LBA) based direct I/O operations, needs to modify an allocation of resources in order to perform such direct I/O operations, or needs to destroy resource allocations, the present invention provides mechanisms to achieve these purposes. In addition, the application may submit work queue entries for processing, and process completion queue entries to obtain information regarding work queue entries whose processing by the physical I/O adapter has been completed. In this way, LBA based direct I/O operations, i.e. block mode I/O operations, are managed by the mechanisms of the present invention.

Moreover, as illustrated in the exemplary embodiments described above, the present invention provides a plurality of data structures and mechanisms for handling LBA based I/O operations. These data structures and mechanisms processor queue to linear block address translation using protection table access control. This mechanism ensures that only an application associated with the portion of the storage device being accessed may actually access the portion of the storage device. A plurality of validation checks, including a key check and a protection domain check, are used to maintain this level of security. These checks ensure that the application instance is accessing a valid adapter protection table entry and that the application has permission to access portions of the storage device associated with a valid protection table entry.

It should be noted that, while the above mechanisms of the exemplary embodiments of the present invention make use of the operating system or system image to perform a number of operations with regard to the creation and management of the adapter protection table entries and LBA table entries, these operations are not generally performed with each work request processed by the adapter. That is, the operating system or system image is only involved in the setup of the adapter protection table entries and the LBA table entries and the registration of the application instances/middleware with the associated LBAS. The operating system or system image is not required in order to process each actual work request submitted by the middleware or application instance since the application and adapter can use the transaction protection table and mechanisms described above to process the work requests. As a result, the present invention eliminates the context switches, and their associated overhead, required by prior art mechanisms, as explained in the background of the invention above.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in an input/output (I/O) adapter, comprising:
   receiving, from an application instance, a user space operation requesting creation of a resource allocation for direct linear block address (LBA) based input/output (I/O) between the application instance and a physical storage device;
   creating the resource allocation in a LBA table entry, of an LBA table, associated with the I/O adapter and the application instance;
   returning results of the creation of the resource allocation to the application instance;
   receiving, from the application instance, a second user space operation requesting de-allocation of second resources; and
   deleting an LBA table entry corresponding to the second resources from the LBA table, wherein deleting the LBA table entry includes:
   determining if an I/O transaction is active on the LBA table entry; and
   deleting the LBA table entry only if there are no I/O transactions active on the LBA table entry.

2. The method of claim 1, wherein creating the resource allocation in the LBA table entry includes using a memory management interface of the I/O adapter to create the LBA table entry.

3. The method of claim 1, further comprising:
   determining if sufficient resources are available to create the resource allocation; and
   returning an error message is there are not sufficient resources available to create the resource allocation.

4. The method of claim 1, wherein deleting an LBA table entry corresponding to the second resources includes using a memory management interface of the I/O adapter to delete the LBA table entry.

5. The method of claim 1, further comprising:
   initiating a timer if there is an I/O transaction active on the LBA table entry;
   determining if a quiescent point is reached before the timer times out; and
   deleting the LBA table entry only if the quiescent point is reached before the timer times out.

6. The method of claim 5, wherein the quiescent point is a point at which no I/O transactions are active on the LBA table entry.

7. The method of claim 1, wherein the LBA table entry includes a pointer to one or more LBAs of the physical storage device, and wherein the LBA table entry is associated with an adapter protection table entry, in an adapter protection table, which is used by an application instance to access the one or more LBAs of the physical storage device.

* * * * *